United States Patent

Greenberg et al.

[11] Patent Number: 5,124,832
[45] Date of Patent: * Jun. 23, 1992

[54] LAMINATED AND SEALED ELECTROCHROMIC WINDOW

[75] Inventors: Charles B. Greenberg, Murrysville; Thomas G. Rukavina, Lower Burrell; David E. Singleton, Natrona Heights, all of Pa.

[73] Assignee: PPG Industries, Inc., Pittsburgh, Pa.

[*] Notice: The portion of the term of this patent subsequent to Sep. 6, 2005 has been disclaimed.

[21] Appl. No.: 415,001

[22] Filed: Sep. 29, 1989

[51] Int. Cl.$^5$ .................................. G02F 1/01
[52] U.S. Cl. ........................ 359/269; 359/275; 359/270
[58] Field of Search .............. 350/355, 357; 359/269, 359/270, 275

[56] References Cited

U.S. PATENT DOCUMENTS

| | | | |
|---|---|---|---|
| 3,521,941 | 7/1970 | Deb et al. | 350/160 |
| 4,088,392 | 5/1978 | Meyers | 350/357 |
| 4,088,395 | 5/1978 | Giglia | 350/357 |
| 4,116,545 | 9/1978 | Reddy | 350/357 |
| 4,174,152 | 11/1979 | Giglia et al. | 350/357 |
| 4,304,465 | 12/1981 | Diaz | 350/357 |
| 4,335,938 | 6/1982 | Giglia et al. | 350/357 |
| 4,361,385 | 11/1982 | Huang et al. | 350/357 |
| 4,375,318 | 3/1983 | Giglia et al. | 350/357 |
| 4,478,991 | 10/1984 | Huang et al. | 526/287 |
| 4,488,781 | 12/1984 | Giglia | 350/357 |
| 4,645,308 | 2/1987 | Tracy et al. | 350/357 |
| 4,768,865 | 9/1988 | Greenberg et al. | 350/357 |
| 4,902,110 | 2/1990 | Green | 350/357 |
| 4,927,246 | 5/1990 | Ito et al. | 350/357 |
| 4,957,352 | 9/1990 | Yasuda et al. | 350/357 |
| 4,958,917 | 9/1990 | Hashimoto et al. | 350/357 |

*Primary Examiner*—Rolf Hille
*Assistant Examiner*—Mahshid Saadat
*Attorney, Agent, or Firm*—Donna L. Seidel

[57] ABSTRACT

An electrochromic transparency comprising an electrochromic film and a preformed, preconditioned ion-conductive polymer sheet laminated between a pair of electrode bearing cell members is disclosed wherein the optimum moisture content of the ion-conducting polymer sheet is maintained by means of a moisture vapor barrier surrounding the perimeter of the cell.

20 Claims, 1 Drawing Sheet

LAMINATED AND SEALED ELECTROCHROMIC WINDOW

BACKGROUND

This invention relates generally to the art of electrochromic cells, and more particularly to the art of transparent electrochromic windows.

Electrochromic devices have been proposed for use in alpha-numeric display panels in items such as digital watches, calculators and the like. The electrochromic image formed by the application of an appropriate voltage to an electrochromic cell persists for a useful period after the activating voltage is discontinued, generally until it is erased by application of an appropriate voltage of reversed polarity.

U.S. Pat. No. 3,521,941 to Deb et al. discloses an electro-optical device having variable optical density useful in data display comprising a pair of transparent electrodes, and a film of transition metal compound and a current carrier permeable insulator disposed between the electrodes, the device exhibiting alternate coloration and bleaching at ambient temperature by control of the polarity of an applied electric field.

U.S. Pat. No. 4,088,392 to Meyers discloses an electro-optical device comprising a pair of electrodes, and a film of a transition metal compound and a liquid electrolyte disposed between the electrodes, the device exhibiting coloration and bleaching thereof by control of the polarity of an applied electric field.

U.S. Pat. No. 4,088,395 to Giglia discloses a method for forming a counter-electrode in a variable light modulating device of the electrochromic type. The counter-electrode is a paper composition of fibrous pulp and carbon.

U.S. Pat. No. 4,116,545 to Reddy discloses an electrochromic variable light modulating device including an improved ion conducting layer comprising a polymeric composition containing polyethylene sulfonic acid, a pigment and water. One of the electrodes comprises a glass substrate with an electroconductive layer of tin oxide over which is deposited an electrochromic tungsten oxide film. The second electrode is a paper electrode comprising a web of filament permeated with carbon, and is compression bonded to tin oxide coated glass.

U.S. Pat. No. 4,174,152 to Giglia et al. discloses electrochromic devices wherein the polymeric electrolyte material is a hydrophilic copolymer of a selected acrylate or methacrylate monomer and a selected acid group containing monomer, e.g. 2-acrylamido-2-methylpropanesulfonic acid.

U.S. Pat. No. 4,335,938 to Giglia discloses electrochromic devices having a layer of tungsten oxide in contact with a layer of organic electrolyte resin comprising a hydrophilic layer of homopolymer of poly(2-acrylamido-2-methylpropanesulfonic acid) with electrode means for changing electrochromic properties of the device. A conventional electrochromic device is described as having a transparent electrochromic electrode comprising a glass substrate with a conductive tin oxide layer and an electrochromic, e.g. tungsten oxide, film; a pigmented, ion-conducting medium layer comprising a self-supporting layer of ion-conductive polymer having a pigment dispersed therein; and an opaque counter electrode such as carbon paper.

U.S. Pat. Nos. 4,361,385 and 4,478,991 to Huang et al. disclose electrochromic devices having a layer of electrochromic tungsten oxide in contact with a polymeric electrolyte wherein the stability and speed of the device are improved by using a copolymer of 2-acrylamido-2-methylpropanesulfonic acid and vinyl sulfonic acid as the polymer electrolyte. An electrochromic film on an electrode is prepared by evaporation of an amorphous film of tungsten oxide onto a glass substrate coated with conductive tin oxide. The polymer mixture is cast, dried and hydrated in contact with the electrochromic film, and then a second electrode consisting of paper-carbon is pressed against the polymer layer with a second tin oxide coated glass plate backing the carbon-paper electrode.

U.S. Pat. No. 4,375,318 to Giglia et al. discloses electrochromic devices having a layer of electrochromic material, e.g. tungsten oxide, in contact with a layer of organic electrolyte resin, with electrode means for changing electrochromic properties of the devices by electric field means. The electrolyte layer comprises a hydrophilic layer of homopolymer of poly(2-acrylamido-2-methylpropanesulfonic acid) with an organic humectant. An electrochromic device is prepared by thermal evaporation of an electrochromic tungsten oxide film onto an electroconductive tin oxide coated glass substrate. A pigmented resin solution is coated over the tungsten oxide and dried to form an ion-conductive polymer film which is hydrated to enhance ionic conductivity. An electrically conductive paper counter-electrode is pressed against the polymer with a graphite coated stainless steel plate.

U.S. Pat. No. 4,645,308 to Tracy et al. discloses a solid-state transition metal oxide device comprising a plurality of layers including an electrochromic oxide layer and anode and cathode contacts. Coloration is actuated within the electrochromic oxide layer by application of a predetermined potential and the coloration action is adapted to sweep across the length of the electrochromic oxide layer.

SUMMARY OF THE INVENTION

The present invention provides an electrochromic cell which is transparent, and which darkens and bleaches completely at an applied electrical potential of about 1.0 volt or less, positive and negative respectively. The electrochromic cell of the present invention comprises a preformed sheet of polymer electrolyte, preconditioned to optimum water content, laminated between two transparent cell walls, the perimeter of the laminated cell being sealed with a moisture vapor barrier to maintain the optimum polymer electrolyte/water ratio.

DESCRIPTION OF THE PREFERRED EMBODIMENTS

Figure 1:
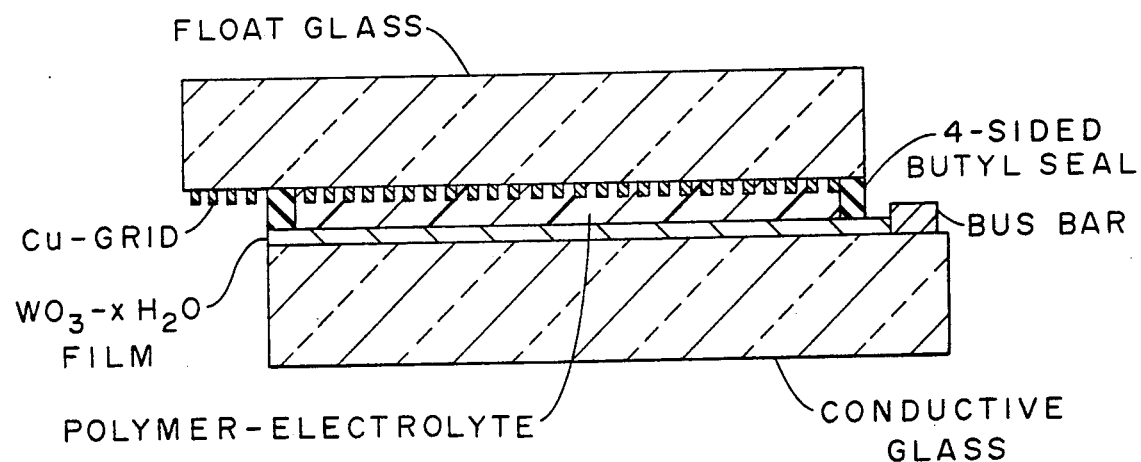
FIG. 1 illustrates a cross-section of a laminated and sealed electrochromic window in accordance with the present invention.

Conventional electrochromic cells comprise a thin film of a persistent electrochromic material, i.e. a material responsive to the application of an electric field of a given polarity to change from a high-transmittance, non-absorbing state to a lower-transmittance, absorbing or reflecting state and remaining in the lower-transmittance state after the electric field is discontinued, preferably until an electric field of reversed polarity is applied to return the material to the high-transmittance state. The electrochromic film is in ion-conductive contact, preferably direct physical contact, with a layer of ion-conductive material. The ion-conductive material of the present invention is a preformed, preconditioned polymer sheet. The electrochromic film and ion-conductive film are disposed between two electrodes.

While the following description relates specifically to tungsten oxide electrochromic films and 2-acrylamido-2-methylpropanesulfonic acid based polymer electrolyte films, it is to be understood as applying to electrochromic cells comprising any suitable electrochromic compound and ion-conducting polymer composition.

The polymer electrolyte sheet may be formed by any conventional method such as casting or extrusion. The polymer electrolyte sheet is preferably preconditioned to a desired moisture content, preferably a water/monomer molar ratio in the range of 1.5–3.9:1. The preconditioning to obtain optimum moisture content is preferably accomplished in a conditioning atmosphere at 23° C. and 58 percent relative humidity. The free polymer electrolyte sheet is conditioned to equilibrium at the optimum water content, preferably about 20 percent for ambient temperature operation. For use at higher temperatures, lower water contents may be preferred. The polymer electrolyte sheet may be conditioned in either a flat position or conformed to a selected curved shape if the laminated final product is to be of curved shape.

The present invention preferably involves the use of a metal mesh as the counter electrode, allowing transparency while providing uniform rapid charge distribution over a large surface area and participating in a balancing half-cell reaction at a lower potential which prevents electrolysis of water and concurrent gas evolution which would otherwise occur.

Instead of the hydrolysis of water at the counter electrode, the balancing half-cell reaction in response to the electrochromic transition of tungsten oxide is the oxidation or reduction of the metal of the metal grid counter electrode which does not produce gas which can form bubbles and decrease the optical quality of the device.

In a preferred embodiment of the present invention, the electrochromic cell is a transparent laminate comprising two glass substrates. One electrode of the cell comprises one of the glass substrates coated with an electroconductive film, preferably tin oxide having a resistivity of about 25 ohms per square or less. The electrochromic film, preferably tungsten oxide, is deposited over the conductive film, preferably by evaporation or sputtering to a preferred thickness of about 1000 to 4000 Angstroms. The second glass substrate is preferably uncoated glass.

To form the counter electrode, a metal grid is disposed adjacent to the second glass substrate. A preferred metal for the grid is copper. For optimum optical properties, the copper grid preferably has line widths on the order of 0.0025 inch (about 0.0635 millimeter) and line spacing of about 20 lines per inch (about 8 lines per centimeter). The metal grid pattern may be square or rectangular, but is preferably a pattern of interconnected circles for optimum optical properties as disclosed in U.S. Pat. No. 4,772,760, the disclosure of which is incorporated herein by reference. Preferred metal grids are produced by electroforming as disclosed in U.S. Ser. No. 07/336,393 filed Apr. 11, 1989, the disclosure of which is incorporated herein by reference. The electrochromic film/conductive film coated glass plate and the uncoated glass plate with adjacent metal grid counter electrode may be spaced about 0.030 inch (about 0.76 millimeter) apart, but preferably about 0.020 inch (about 0.51 millimeter) or less. Disposed in this space is the preformed, preconditioned ion-conductive polymer sheet of the present invention. Preferred ion-conductive polymers include homopolymers of 2-acrylamido-2-methylpropanesulfonic acid and copolymers thereof with vinyl sulfonic acid. Electrical connections to the electrochromic film and metal grid counter electrode are preferably made by means of a bus bar arrangement as disclosed in U.S. Ser. No. 07/406,477 filed Sep. 13, 1989, entitled "Electrochromic Window with Integrated Bus Bars".

The cell voltage in accordance with the present invention is sufficiently low so that the following electrolysis reactions of water, with concurrent evolution of gas which can form bubbles, do not occur:

| Electrode | Reaction | Standard Potential |
|---|---|---|
| Anode | $2H_2O \longrightarrow 4H^+ + O_2 + 4e^-$ | $-1.229$ volts |
| Cathode | $2H_2O + 2e^- \longrightarrow H_2 + 2OH^-$ | $-0.828$ volt |

Instead, the metal grid counter electrode participates in balancing half-cell reactions at lower absolute potentials. For a copper grid counter electrode, the following balancing half-cell reactions preferentially occur:

| Electrode | Reaction | Standard Potential |
|---|---|---|
| Anode | $Cu \longrightarrow Cu^+ + e^-$ | $-0.521$ volt |
|  | $Cu^+ \longrightarrow Cu^{++} + e^-$ | $-0.153$ volt |
| Cathode | $Cu^{++} + e^- \longrightarrow Cu^+$ | $0.153$ volt |
|  | $Cu^+ + e^- \longrightarrow Cu$ | $0.521$ volt |

The polymer electrolyte sheet is laminated between the two transparent electrode bearing plies under typical autoclave laminating conditions, preferably about 200° to 225° F. (about 93° to 107° C.) and about 150 pounds per square inch pressure. Although conventional polymer interlayers such as polyvinyl butyral have to be embossed to allow air egress, and very dry to prevent bubble formation, the preconditioned polyelectrolyte sheet of the present invention is readily laminated without embossing and without bubble formation, even with water content of 20 percent.

The perimeter of the electrochromic cell is sealed in accordance with the present invention with a moisture vapor barrier to maintain the desired water content in the polymer electrolyte. The moisture vapor barrier preferably comprises a polymer sealant which is moisture vapor impervious. Preferred polymer sealants have a moisture vapor transmission rate less than 50 grams per square meter per 24 hours per mil (0.0254 millimeter) of thickness at about 40° C. and 90 to 95 percent relative humidity, preferably less than 20 grams per square meter per 24 hours per mil. A preferred sealant material is butyl rubber. The butyl rubber may be applied in the form of a cold-flowable bead which is applied by pressure along the edges of the cell, across the edge of the polymer electrolyte between the two transparent plies. The butyl rubber may also be applied in the form of a butyl rubber-backed metal foil tape, preferably an aluminum foil tape wide enough to overlap the front and back surfaces of the electrochromic cell, preferably by about ¼ inch (about 6.35 millimeters). In a most preferred embodiment, after the polymer electrolyte sheet is laminated under heat and pressure between two glass sheets, a butyl rubber bead is applied about the perimeter covering the edge of the polymer electrolyte sheet. Then a butyl rubber-backed foil tape is applied over the butyl rubber bead. Preferred sealant compositions having moisture vapor transmission rates less than 8 grams per square meter per 24 hours per mil of thickness are disclosed in U.S. Pat. No. 4,109,431, the disclosure of which is incorporated herein by reference.

The present invention will be further understood from the description of specific examples which follow.

EXAMPLE I

A polymer electrolyte sheet is prepared by casting from a solution of about 50 percent by weight in water of 2-acrylamido-2-methylpropane sulfonic acid (AMPS ® monomer from Lubrizol Corp.). The polymer electrolyte is partially dehydrated in a controlled atmosphere of 23° C. and 58 percent relative humidity to a final water/AMPS molar ratio of 3.6:1 in the controlled atmosphere. The preformed, preconditioned polymer electrolyte sheet can be assembled into a working electrochromic cell as in the following example.

EXAMPLE II

A transparent electrochromic cell is prepared using two glass cell members. One glass substrate is clear 3 millimeter thick float glass. The other is 5 millimeter thick float glass coated with a tin oxide film having a resistivity of 25 ohms per square. The conductive tin oxide glass member functions as an electrode, with a silver frit bus bar applied about the periphery. An electrochromic tungsten oxide film, $WO_3 \cdot yH_2O$, wherein y represents the extent of hydration, is deposited over the conductive tin oxide film by resistive evaporation at an initial vacuum chamber pressure of about $4 \times 10^{-6}$ Torr. The electrochromic tungsten oxide film is deposited to a thickness of about 4000 Angstroms. The electrochromic film/conductive film coated glass member is assembled with a performed, preconditioned ion-conductive polymer sheet prepared as in Example I, a metal grid couterelectrode and an uncoated glass member. The metal grid counterelectrode is an electroformed copper square grid with 0.0025 inch lines at 20 lines per inch spacing. This assembly is laminated in an air autoclave at 200° F. (about 93° C.) at 150 pounds per square inch pressure for 60 minutes. After lamination, the perimeter of the cell is sealed with butyl tape. The aluminum foil-backed butyl tape is wide enough to cover the edge of the cell and overlap about ¼ inch (about 6.35 millimeters) on both glass surfaces to maintain the optimized moisture content in the polymer electrolyte sheet. The electrochromic cell thus formed has a luminous transmittance of about 70 percent at a wavelength of 550 nanometers. When an electric current is applied across the cell at a superficial current density of about 0.05 milliamps per square centimeter, the electrochromic film darkens to 20 percent transmittance in about 2 minutes. When the polarity is reversed, the electrochromic film returns to its initial transmittance in about 2 minutes.

The above examples are offered only to illustrate the present invention. While the above example utilizes a tungsten oxide electrochromic film, any electrochromic material may be employed, such as transition metal oxides, transition metal sulfides, transition metal oxysulfides, transition metal halides, selenides, tellurides, chromates, molybdates, tungstates, vanadates, niobates, tantalates, titanates, stannates, etc., especially oxides, sulfides and stannates of metals of Groups IV-B, V-B and VI-B, and oxides and sulfides of Lanthanide Series metals, particularly, in addition to tungsten oxide, molybdenum oxide, titanium oxide, vanadium oxide, niobium oxide, cerium oxide, copper stannate, cobalt tungstate and various metal molybdates, titanates and niobates. Other electrochromic materials which reverse by short-circuiting or are effective only at elevated temperatures may also be employed, as well as organic materials such as polyaniline, polythiophene, polyisothianaphthene and polypyrrole. The ion-conductive layer may be chosen to be permeable to ions other than hydrogen, such as lithium, and may be formed by other methods, such as extrusion. The metal mesh counter electrode may comprise nickel or other metals or alloys as well as the preferred copper. The metal mesh counter electrode may be coated with another material in order to provide a particularly desired balancing half-cell reaction, i.e. at a potential lower than that of the electrolysis of water, e.g. nickel coated with tungsten oxide or niobium oxide. While electroforming is a preferred method for producing the counter electrode, any method which produces a grid with acceptable optical properties may be employed. The electrode in contact with the electrochromic material may also be in the form of a metal mesh, in which case the grid patterns of the two electrodes may be designed to complement each other or to provide particular optical properties. The substrate members of electrochromic cells may be any suitably transparent material, and the sealant may be any suitably adhesive material with sufficiently low moisture vapor transmission to maintain the desired moisture content in the polymer electrolyte sheet over the useful life of the electrochromic cell, such as polyisobutylene, poly(isobutene-isoprene), polyethylene, polypropylene, polyvinylchloride, polyvinylfluoride, polytrifluorochloroethylene, polytetrafluoroethylene and polyethylene terephthalate. The scope of the present invention is defined by the following claims.

We claim:

1. An article of manufacture having variable transmittance in response to an electric field comprising:
   a. a first transparent substrate;
   b. an electroconductive electrode member;
   c. a transparent electrochromic film in contact with said electroconductive electrode member;
   d. a preformed, preconditioned ion-conductive polymer sheet in contact with said electrochromic film;
   e. a counter electrode in contact with said ion-conductive polymer sheet;
   f. a second transparent substrate which in combination with said first transparent substrate form the walls of an electrochromic cell; and
   g. a moisture vapor barrier surrounding the perimeter of said cell.

2. An article according to claim 1, wherein said transparent substrate is glass.

3. An article according to claim 1, wherein said electroconductive electrode member is a transparent film selected from the group consisting of tin oxide, indium oxide and mixtures thereof.

4. An article according to claim 1, wherein said counterelectrode is a grid comprising a metal selected from the group consisting of nickel, copper and mixtures thereof.

5. An article according to claim 1, wherein said transparent electrochromic film comprises an electrochromic material selected from the group consisting of transition metal oxides, transition metal sulfides, transition metal oxysulfides, transition metal halides, selenides, tellurides, chromates, molybdates, tungstates, vanadates, niobates, tantalates, titanates, stannates, polyaniline, polythiophene, polyisothianaphthene and polypyrrole.

6. An article according to claim 5, wherein said electrochromic film comprises tungsten oxide at a thickness of 1000 to 4000 Angstroms.

7. An article according to claim 1, wherein said ion-conductive polymer sheet comprises 2-acrylamido-2-methylpropanesulfonic acid.

8. An article according to claim 7, wherein the ion-conductive polymer sheet contains water in a molar ratio of 1.5:1 to 3.9:1 water to 2-acrylamido-2-methylpropane sulfonic acid.

9. An article according to claim 1, wherein said moisture vapor barrier comprises butyl rubber.

10. An article according to claim 9, wherein said butyl rubber is in the form of a butyl rubber-backed metal foil tape.

11. A method for producing an electrochromic cell comprising the steps of:
  a. forming a sheet of polymer electrolyte;
  b. conditioning said sheet to a desired moisture content;
  c. laminating said sheet between a pair of transparent substrates encompassing transparent electrodes and a transparent electrochromic film to form an electrochromic cell; and
  d. sealing the perimeter of said cell with a moisture vapor barrier.

12. A method according to claim 11, wherein said sheet of polymer electrolyte is formed by casting a solution of 2-acrylamido-2-methylpropane sulfonic acid and curing.

13. A method according to claim 12, wherein said sheet is conditioned by exposure to a sufficient temperature and relative humidity for a time sufficient to yield a molar ratio of water to 2-acrylamido-2-methylpropane sulfonic acid monomer in the range of 1.5:1 to 3.9:1.

14. A method according to claim 11, wherein said sheet is laminated under heat and pressure between a pair of glass sheets.

15. A method according to claim 14, wherein said laminating is performed at a temperature of about 200° to 225° F. (about 93° to 107° C.) and pressure of about 150 pounds per square inch.

16. A method according to claim 15, wherein said sealing is accomplished by applying butyl rubber about the perimeter of said cell.

17. A method according to claim 16, wherein said butyl rubber is applied by pressing a butyl rubber bead along the perimeter of said cell.

18. A method according to claim 16, wherein said butyl rubber is applied in the form of a butyl rubber-backed metal foil tape.

19. A method according to claim 18 wherein said tape overlaps the front and back surfaces of said cell.

20. A method according to claim 19, wherein said sealing further comprises applying a butyl rubber bead under said tape.

* * * * *